United States Patent [19]

Chia et al.

[11] Patent Number: 4,822,057
[45] Date of Patent: Apr. 18, 1989

[54] MECHANICAL FACE SEAL FOR ROCK BITS

[75] Inventors: Weng-Kwen R. Chia, Irvine; George F. Anderson, Buena Park, both of Calif.

[73] Assignee: Smith International, Inc., Newport Beach, Calif.

[21] Appl. No.: 176,072

[22] Filed: Mar. 31, 1988

[51] Int. Cl.⁴ .............................................. F16J 15/38
[52] U.S. Cl. ..................................... 277/84; 277/92; 277/96.2; 277/236
[58] Field of Search .......................... 277/81 R, 82–84, 277/92, 95, 96, 96.2, 236

[56] References Cited

U.S. PATENT DOCUMENTS

| | | | |
|---|---|---|---|
| 1,470,621 | 10/1923 | Jackson | 277/96.2 X |
| 2,425,209 | 8/1947 | Snyder et al. | 277/96.2 |
| 3,180,648 | 4/1959 | Kupfert et al. | |
| 3,403,916 | 10/1968 | Durham et al. | |
| 3,524,654 | 8/1970 | Hasselbacher et al. | |
| 3,601,413 | 8/1971 | Darnell | 277/96.2 |
| 3,752,243 | 8/1973 | Hummer et al. | 277/92 X |
| 3,810,637 | 5/1974 | Bonvin | 277/96.2 |
| 3,940,154 | 2/1976 | Olsson | 277/92 |
| 4,306,727 | 12/1981 | Deane et al. | |
| 4,344,629 | 8/1982 | Oelke | |
| 4,394,020 | 7/1983 | Oelke | |
| 4,560,175 | 12/1985 | Kar et al. | |
| 4,632,401 | 12/1986 | Nareshchandrakar et al. | 277/92 X |
| 4,666,001 | 5/1987 | Burr | |
| 4,722,404 | 2/1988 | Evans | |

Primary Examiner—Robert S. Ward
Attorney, Agent, or Firm—Robert G. Upton

[57] ABSTRACT

A metal-to-metal Belleville seal for a rotary cone rock bit consists of pre-lapped metal sealing surfaces formed on opposing seal rings prior to assembly of the seal rings into seal cavities formed between the rotary cones and their respective journal bearings. A first seal ring is fabricated from a softer metallic material than its opposing second metallic ring and the second ring has more seal surface area than the first ring to accommodate for cone wobble or eccentricities that may occur during operation of the bit in a borehole.

20 Claims, 4 Drawing Sheets

MECHANICAL FACE SEAL FOR ROCK BITS

BACKGROUND OF THE INVENTION

1. Field of the Invention

This invention relates to a high-speed Belleville type seal for a rotary cone rock bit.

More particularly, this invention relates to a high-speed metal-to-metal Belleville seal for a rotary cone rock bit; the dynamic metal sealing surfaces being pre-lapped prior to assembly.

2. Description of the Prior Art

There are prior art patents that describe composite seals that are fabricated of resilient material that encapsulates or is adjacent to a metal sealing ring. For example, U.S. Pat. Nos. 4,344,629 and 4,394,020 both of which are assigned to the same assignee as the present invention, describes and teaches a metal-to-metal seal, the metal sealing surfaces of which are not pre-lapped prior to assembly. Both of these patents feature a resilient seal that initially operates to provide a seal while the metal-to-metal dynamic sealing surfaces are being lapped-in during operation of the rotary cone rock bit in a borehole. The U.S. Pat. No. 4,344,629 teaches a non-lapped metal ring that is encapsulated within a resilient material. The resilient material serves to initially provide a seal while the metal surfaces progressively lap themselves in as each rotary cone rotates on its journal while the bit works in a borehole. The U.S. Pat. No. 4,394,020 teaches a metal ring that is bonded to resilient material with a separate O-ring confined within an annular slot formed in the metal ring of the seal. The O-ring, like the U.S. Pat. No. 4,344,629 serves to provide the initial seal while the dynamic metal sealing surfaces are being lapped-in during bit operation.

U.S. Pat. No. 4,666,001 describes an earth-boring bit with metal-to-metal seals. A rigid face seal assembly is positioned between the cutter and bearing shaft of the rotary bit. The seal assembly moves axially in response to and to compensate for dynamic pressure changes in the lubricant adjacent to the seal. The metal-to-metal seal is designed to translate axially within an enlarged seal cavity during operation of the bit in a borehole to react to sudden changes of pressure across the seal face.

The foregoing patent is similar to a typical "Caterpillar" type seal, examples of which are found in U.S. Pat. Nos. 3,180,648, 3,403,916, and 3,524,654 all of which are assigned to the Caterpillar Corporation and which teach improvements to their basic metal-to-metal seal.

U.S. Pat. No. 4,306,727 describes a dynamic seal for sealing between a rotary cutter and a drill bit journal in an underground formation drilling bit. The seal utilizes a static elastomeric seal ring abutting a metal seal ring having a dynamic seal face. A metal sealing ring is biased against the cone surface by an elastomer wedged between the intersection of the leg and the journal and an L-shaped metal dynamic ring adjacent the cone.

Another related patent assigned to the same assignee as the foregoing patent teaches a very similar sealing arrangement, except that there are two dynamic L-shaped sealing rings that are suspended between two diagonally positioned elastomers such that the two L-shaped rings float in a seal cavity formed between the cone and the journal.

Another prior art U.S. Pat. No. 4,722,404 describes a low friction seal assembly for use with a rotary drill bit having bit cutters manufactured by casting the rotary cutters. The seal assembly includes a seal element having a Belleville spring surrounded by an elastomeric material. The static side of the seal is positioned in a roughened groove in the cast cone such that the inner dynamic sealing side of the Belleville seal is positioned near the intersection of the journal and the leg backface. Typically, a Belleville seal has the static side of the seal at this intersection of the journal in the leg backface, the dynamic sealing surface being adjacent the rotary cone. One embodiment of this patent discloses a metal ring adjacent the dynamic side of the Belleville seal that runs against a surface nearest the intersection of the journal and the leg backface.

These patents, while they illustrate and teach metal-to-metal seals, do not elaborate on materials of the metal seals. The present invention teaches the use of a static metal sealing ring, the sealing surface of which comprise a relatively softer metallic material than an opposite dynamic sealing surface. The static or non-moving seal ring of softer material is lapped against the harder material on the dynamic oppositely facing sealing ring. The hard and soft materials of the seal rings are pre-lapped prior to assembly of the seal between a journal bearing and a rotary cone. The softer sealing surface is preferably smaller in surface area than the harder dynamic sealing surface to accommodate for cone wobble or eccentricities that may occur between the cone and the journal during operation of the rotary cone rock bit in a borehole.

The first mentioned prior art patents assigned to the same assignee as the present invention taught the use of metal-to-metal seals that were not pre-lapped prior to use, the basic seal relying on a resilient material to provide the initial seal during the lapping process. The present invention differs in that the metal rings of the seal are pre-lapped, the softer static seal ring material, being run or lapped against the harder dynamic surface of the dynamic sealing ring.

The pressure compensated metal-to-metal floating sal previously described emphasizes the pressure compensating aspect of the seal assembly confined within a seal cavity and does not specifically teach the materials used in formulating the metal-to-metal seal.

The '727 patent, while it describes a metal-to-metal seal, does not elaborate on the materials of the dynamic seal faces within a rotary cone rock bit. The same is true for the '622 patent wherein back-to-back dynamic sealing rings are positioned within a sealed cavity of a rotary cone rock bit. These two patents emphasize the elastomeric material biased between the leg backface and the metal sealing ring adjacent the cone or similar L-shaped ring backed against the first ring.

The '404 patent, while it describes a Belleville type seal, illustrates the Belleville seal in a reverse configuration than is typical of a Belleville seal in a rotary cone rock bit. This particular patent is disadvantaged in that, since the dynamic seal surface is opposite to a standard Belleville seal, the Belleville seal as shown will act as a natural pressure relieving valve. Unfortunately, the valving action will admit debris that exteriorly surrounds the seal cavity. Standard Belleville type seals in the typical, reverse orientation will valve in the opposite direction, hence, lubricant will be expelled past the dynamic sealing faces thus purging the seal face of any detritus, rather than admitting contaminants therein.

SUMMARY OF THE INVENTION

It is an object of this invention to provide an improved pre-lapped metal-to-metal Belleville type seal for a sealed bearing rotary cone rock bit.

More particularly, it is an object of this invention to provide an improved pre-lapped metal-to-metal Belleville seal for a sealed bearing rotary cone rock bit, wherein the sealing surface of a first lapped seal ring is comprised of a softer material than the material that forms an opposite leg facing lapped sealing surface.

A metal-to-metal Belleville seal for a rotary cone rock bit, is positioned in a seal cavity formed between a leg of the rock bit, and a rotatable cone mounted on a journal bearing extending from the leg. The Belleville seal consists of a first metal ring positioned adjacent the outer peripheral end of the Belleville seal. A first radially disposed sealing surface is formed from a metallic material of the metal ring. The metal ring subsequently serves as part of the metal-to-metal seal.

A second radially disposed sealing surface is formed from a metal material that is part of or is metallurgically bonded to the cone. The second sealing surface is positioned adjacent to the first radially disposed sealing surface of the metal ring. The metallic material forming the first sealing surface is softer than the metallic material forming the second sealing surface in the cone. The first and second sealing surfaces are pre-lapped to substantially perfect a seal between sealing surfaces prior to insertion of the Belleville seal into the seal cavity formed between the leg and the cone of the rotary cone rock bit.

A resilient material forming the outer peripheral end of the Belleville seal is adapted to conform to and be secured to the first metal ring. The Belleville seal serves to urge the first radially disposed metal sealing surface against the second metal radially disposed sealing surface to maintain the first and second sealing surfaces in sealing engagement thereby.

An advantage then, over the prior art is the use of a hard sealing surface that is lapped against a softer sealing surface to make up a pre-lapped Belleville seal for a rotary cone rock bit.

Yet another advantage of the present invention over the prior art is the relationship of a wider sealing surface adjacent a narrower sealing surface to accommodate for wobble and eccentricity that may take place when a rotary cone rock bit works in a borehole.

The above-noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
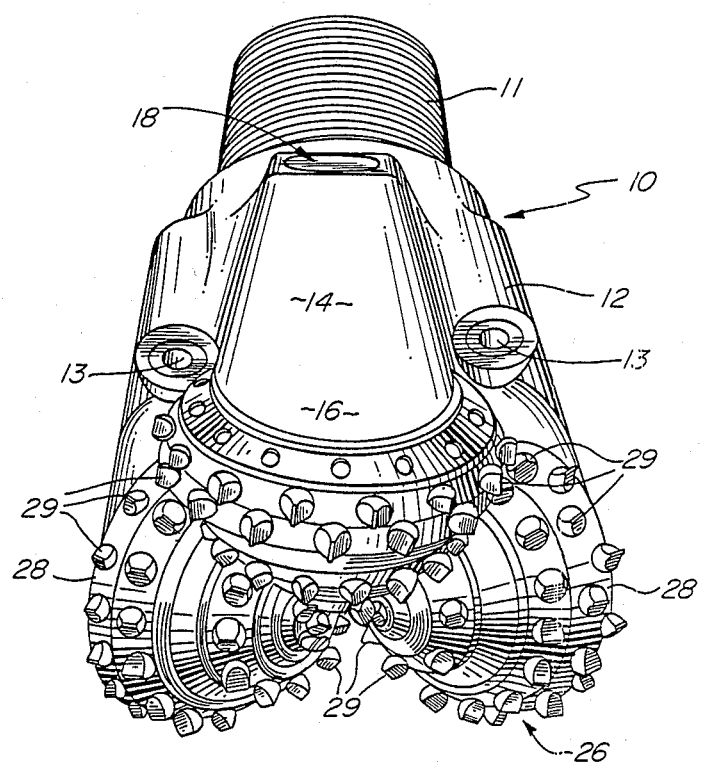
FIG. 1 is a perspective view of a typical rotary cone rock bit.

With reference now to FIG. 1, the seal bearing rotary cone rock bit generally designated as 10, consists of rock bit body 12, pin end 11 and cutting end generally designated as 26. Each cone 28 making up cutting end 26 is attached to a leg 14 that terminates in a shirttail portion 16. Each of the cones 28 has, for example, a multiplicity of equally spaced tungsten carbide cutter inserts 29, interference fitted within insert holes formed in the cone bodies 28. A lubricant reservoir, generally designated as 18, is provided in each of the legs 14 to supply lubricant to bearing surfaces formed between the rotary cones and their respective journals. Three or more nozzles 13 communicate with a chamber formed inside the bit body 12 (not shown). The chamber receives drilling fluid or "mud" through pin end 11. The fluid then is directed out through the nozzles 13 during bit operation.

Figure 2:
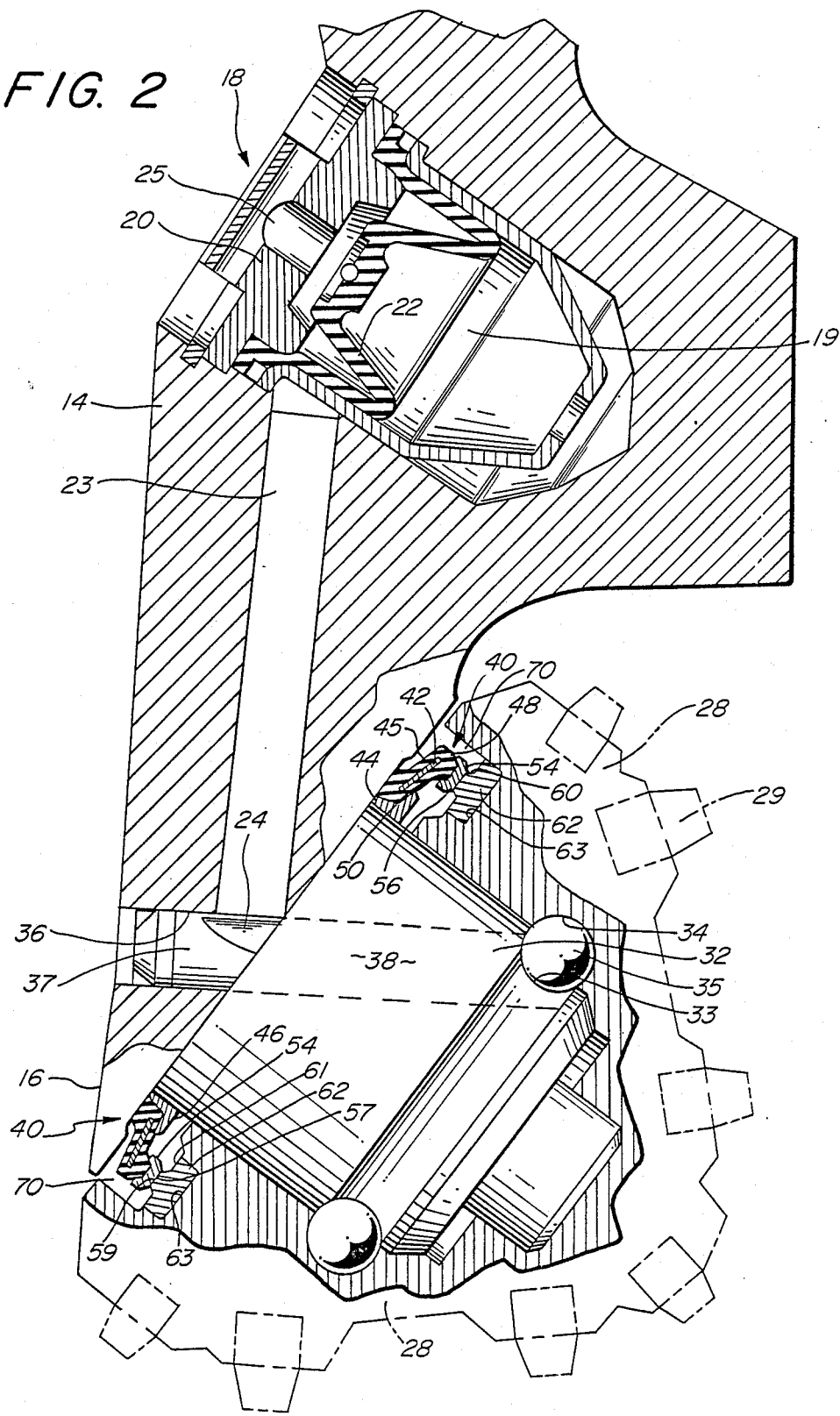
FIG. 2 is a partially broken away section of a leg of a rotary cone rock bit illustrating a portion of the cone mounted onto a journal bearing.

Turning now to FIG. 2 the rock bit leg 14 is shown in cross-section revealing the lubricant reservoir system generally designated as 18. The reservoir system comprises a reservoir cover cap 20 which closes out a lubricant reservoir cavity 19. The reservoir 19 is isolated from the cover cap by a resilient diaphragm 22; the diaphragm being responsive to exterior pressure through the hole 25 formed in the cover cap 20. Lubricant is passed down lubricant channel 23 formed in leg 14 towards ball hole 36 formed through the shirttail portion 16. Lubricant then enters into a lube channel 24 formed in a ball hole lug 37. Lubricant passes to the bearing surfaces formed between the journal 32 and the cone 28 via ball races 33 and 34.

A series of cone retention balls 35 are passed through the ball hole 36 into the bearing races 33 and 34 formed in the journal and the cone respectively. After all the cone retention balls are in place, the ball hole plug 37 is typically inserted and welded in place to retain the balls within the race.

Figure 3:
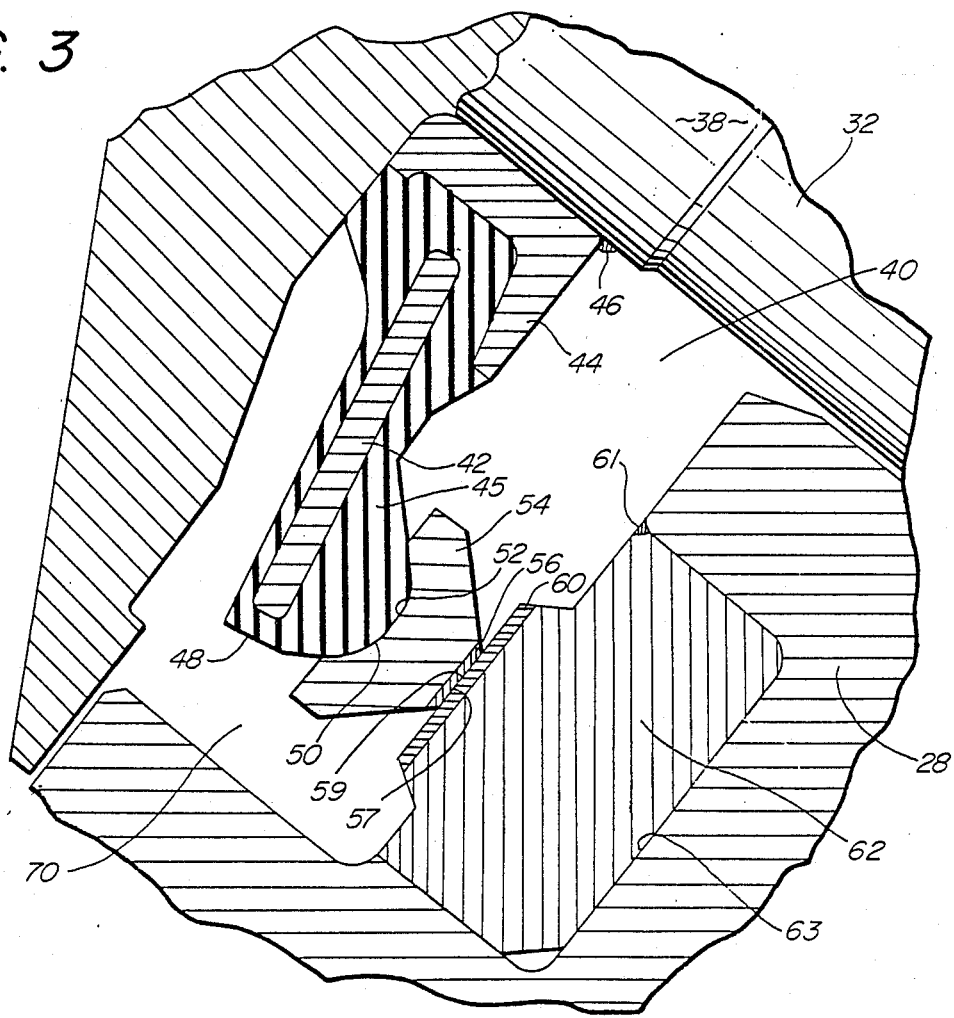
FIG. 3 is an enlarged view of a preferred metal-to-metal Belleville seal housed within the seal cavity shown in FIG. 2 formed between the journal bearing and the rotary cone.

With reference now, to the preferred embodiments depicted in FIGS. 2 and 3, a metal-to-metal Belleville seal, generally designated as 40, consists of an encapsulated Belleville spring 42 and a partially encapsulated annular lock ring 44. The inner lock ring 44 is preferably metallurgically secured to the journal 32 with a 360 degree laser weld at intersection 46.

The foregoing process is the teaching of U.S. Pat. No. 4,560,175 assigned to the same assignee as the present invention and incorporated by reference hereby.

The outer peripheral end 48 of the Belleville seal 40 forms an annular rounded convex surface 50 that nests within a complementary concave surface 52 formed in an annular metal ring 54. The ring 54 has, for example, metallurgically bonded thereto a relatively soft metallic material 56 that has an exterior radial sealing surface 57 that is highly polished and lapped against a similarly polished and lapped sealing surface 59 formed from outer material 60 that is, for example, metallurgically bonded to and confined within a radial ring 62. The radially disposed ring 62 is preferably metallurgically bonded at the annular intersection 61. The annular ring 62 is adapted to fit within a recess 63 formed within a cone mouth or seal cavity 70 of the cone 28.

The two lapped materials 56 and 60 are, for example, pre-lapped together prior to inserting the radially disposed ring 62 within recess 63 formed in the cone mouth 70 of cone 28.

The ring 62 again, may, for example, be laser welded and hermetically sealed at intersection 61.

The lapped surface 59 of hard material 60 bonded within metal ring 62 has the surface area larger than the lapped surface area 57 of the softer material 56, the larger sealing surface 59 on material 60 accommodates for cone wobble or eccentricities that may occur during operation of the rock bit 10 in a borehole (not shown).

With reference now to the enlarged drawing of FIGURE 3, the seal generally designated as 40 is shown within seal cavity 70 of cone 28.

The seal ring 54 adjacent end 48 of the Belleville seal 40 is made of a metal such as stellite or tribaloy. The tribaloy material is preferred. Tribaloy metal, generally, contains cobalt, silicon and molybdenum. While some of the tribaloys may contain chromium, nickel or tungsten, as well as other elements. The tribaloy material may range in hardness from 42 to 62. An example of the preferred tribaloy wear-resistant inner metallic materials is fabricated by Stoody Delor Stellite Corporation of California and is designated as T-400, T-700 or T-800. The preferred grade of tribaloy is T-800 having a Rockwell C hardness of 62. The material 60 fabricated from, for example, tungsten carbide having a Rockwell C hardness about 10 points harder than the Rockwell C hardness of the opposing softer material 56. For example, if the tribaloy material 56 is T-800 with a Rockwell C hardness of 62 the Rockwell C hardness of the opposing tungsten carbide material 60 would be about 72. The two surfaces (57 of material 56 and 59 of material 60) should preferably be lapped within two helium light bands with a surface finish from 2 to 4 rms.

The radially disposed ring 62 and annular ring 54 are pre-lapped together prior to assembly of the rings within the seal cavity 70. It would be very difficult to lap a sealing surface within the cavity 70 formed in the cone 28. Hence, seal rings 54 and 60 are carefully paired in their sealing surfaces 57 and 59 completely finished prior to metallurgically securing a radial ring 62 within the cone mouth or recess 63.

Moreover, the rings 54 and 62 could be fabricated from tribaloy and tungsten carbide respectively thereby eliminating the bonding of fusion process whereby the preferred materials (tribaloy 56 and tungsten carbide 60) is secured to rings 54 and 62. The resilient material 45 encapsulating the Belleville spring 42 is preferably bonded to the annular concave surface 52 of ring 54 at surface 50 near the end 48 of the Belleville spring 40. Surface 50 and 52 may be bonded together by well-known vulcanization processes. It would also be desirable to roughen the surface 52 to about a 120 rms for better bonding of the resilient material 45 to the ring 54. The resilient material 45 is typically fabricated from a nitrile material.

The resilient nitrile material 45, should have a Shore hardness of between 50 and 70.

While it is preferred that the annular ring 54 be bonded or secured to the surface 50 of the Belleville spring 40, the two surfaces need not be bonded as long as an effective seal is established between the annular bump 50 and its conforming recess 52 in ring 54.

It is preferred that the ring 54 be secured at surface 52 of the ring and convex surface 50 of the Belleville seal 40 by an adhesive such as Loc-Tite super bond thermal cycle gel designated as 499 by the manufacturer, Loc-Tite Corporation of Connecticut. The ring may also be bonded to the Belleville seal by well-known vulcanization processes.

Figure 4:
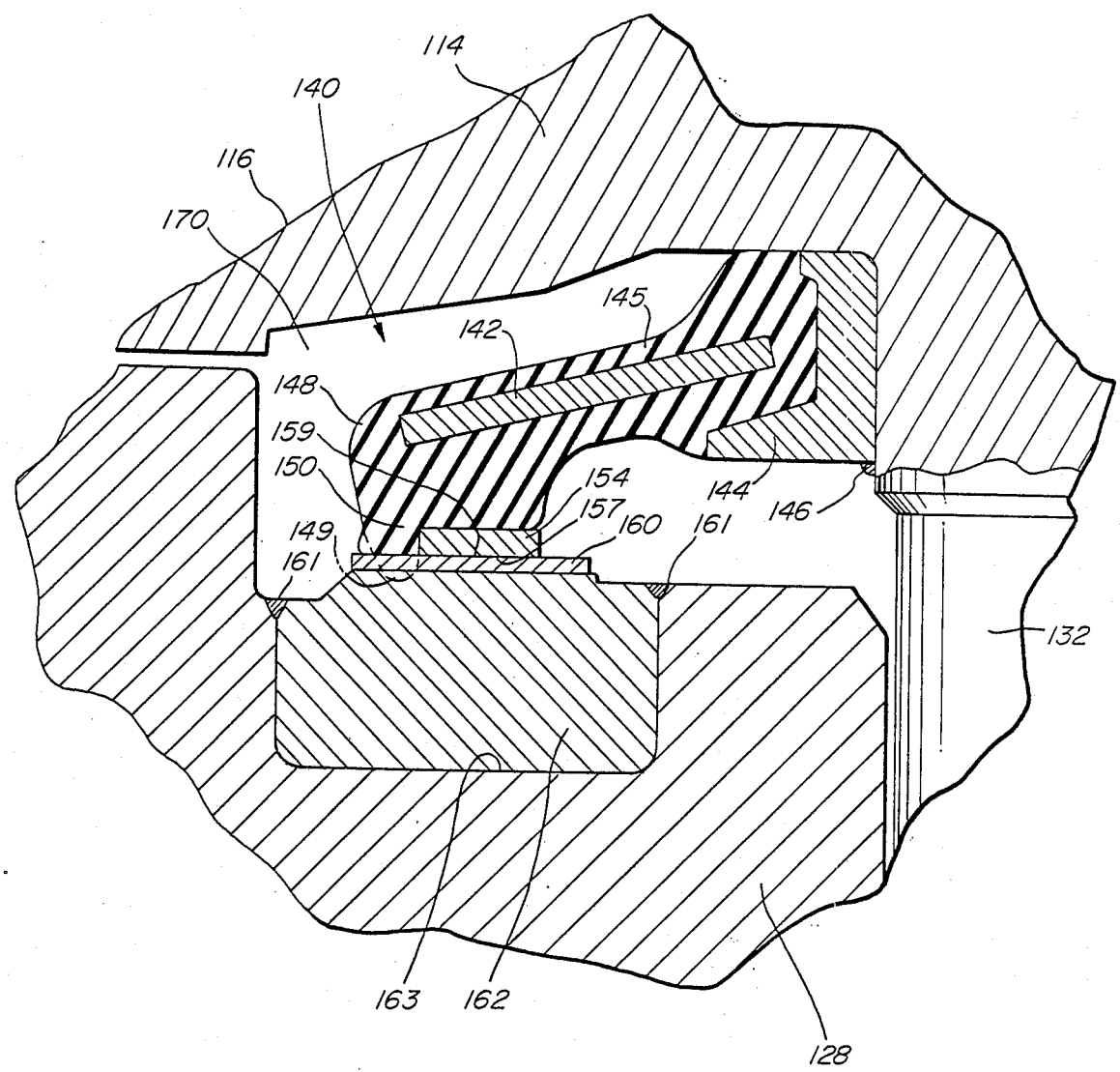
FIG. 4 is an alternative embodiment of a metal-to-metal Belleville seal enclosed within a seal cavity formed between the journal bearing and the cone of the rock bit.

Turning now to FIG. 4, an alternative embodiment is shown wherein the seal assembly, generally designated as 140, is comprised of a Belleville spring 142 encapsulated within, for example, a nitrile rubber-like material 145. The inner diameter, or base, of the Belleville spring is comprised of an annular metal lock ring 144 that is bonded or secured to the nitrile rubber 145. Again, the ring 144 is preferably secured to the journal 132 by a weld at junction 146. The outer peripheral end 148 of the Belleville spring 140 is secured to an annular radially disposed metal ring 154.

An annular seal bump 150 protrudes from outer peripheral end 148 and extends past the surface of the radially disposed ring 154 such that it provides a seal to help protect the sealing surfaces. The nitrile rubber 145 in the free state is shown in phantom 149, this portion being compressed when the seal surfaces are in contact with one another.

As heretofore stated the ring 154 is bonded to the nitrile rubber 145 encapsulating the Belleville spring 142. The ring 154 is fabricated from a metal such as stellite or tribaloy. The tribaloy material is the much preferred material.

A radially disposed ring 162 is inlaid into a recess 163 formed in the cone mouth 170 in cone 128. Again, the radially disposed ring 162 is preferably laser welded into the cone 128 at junction 161. A layer of hard material such as the preferred tungsten carbide 160 is bonded to or secured to ring 162. The opposing sealing surfaces 157 of the tribaloy material 154 and surface 159 of the tungsten carbide material 160 are lapped together and are preferably lapped within two helium light bands with the surface from 2 to 4 rms. The lapped surface 159 of material 160 has a surface area larger than the lapped surface 157 of the softer tribaloy material 154. The larger sealing surface 159 accommodates for cone wobble or eccentricities that may occur during operation of the rock bit 10 in a borehole (not shown).

It is important to note that the radially disposed ring 162 and the ring 154 are bonded to the end of Belleville seal 140 are pre-lapped together prior to assembly of the sealing rings within the seal cavity or cone mouth 170. It would be very difficult to lap a sealing surface within the cavity 170 formed in the cone 128. Hence, seal rings 154 and 160 are carefully paired and their sealing surfaces 157 and 159 completely finished prior to metallurgically securing radial ring 162 within the annular recess 163 formed within the cone 128.

Moreover, the rings 154 and 160 may be fabricated completely from the tribaloy and the tungsten carbide materials thereby eliminating the bonding or fusion process whereby the preferred material (tribaloy 154 and tungsten carbide 160) is secured to rings 154 and 160.

The annular bump 150, when the sealing surfaces 157 and 159 are urged together by the Belleville spring 142, is compressed against the outer peripheral surface of the tungsten carbide material 160. The bump thus provides a seal for the polished surfaces 157 and 159 during operation of the bit in a borehole.

It should additionally be noted that a Belleville type seal generally acts as a one-way valve. Internal pressures within the rock bit and within the sealed lubrication system, if they should exceed certain limits, the Belleville seal will break the seal between polished surfaces 157 and 159, thus, allowing the excess pressure to pass the sealing surfaces to the exterior of the bit. Thus, it can be realized that this one-way valving action prevents detritus or debris from entering or ruining the polished sealing surfaces 157 and 159. The bump 150 acts as a backup seal to discourage any detritus or debris from entering the protected bearing surfaces through the seal 140.

Figure 5:
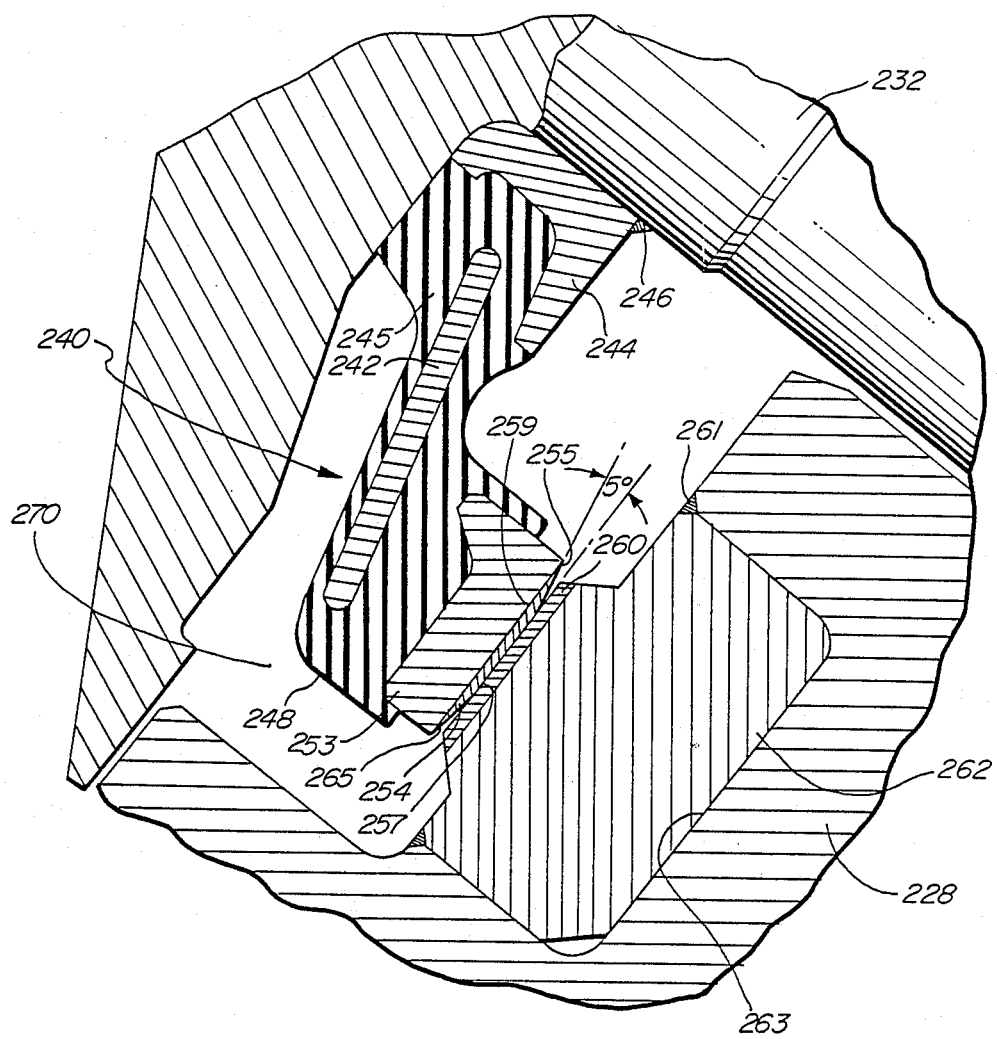
FIG. 5 is yet another embodiment of a metal-to-metal Belleville seal.

And yet, another alternative embodiment is illustrated in FIG. 5 wherein the metal-to-metal seal assembly generally designated as 240 comprises a Belleville spring 242 encapsulated within rubber 245, the spring being secured to an inner lock ring 244. The lock ring again, being laser welded to the journal 232. The outer peripheral end 248 partially encapsulates a radially disposed annular ring 263. A layer of the preferred tribaloy material 254, is metallurgically bonded to the ring 253. A flattened surface 257 of tribaloy material of 254 is polished and mated to surface 259 of the preferred tungsten carbide material 260. The tungsten carbide is metallurgically bonded to radially disposed ring 262 seated within annular groove 263 formed in cone 228. The ring, again, is welded at intersection 261 within cone 228. The exposed surface 255 of ring 253 is angled approximately five degrees with respect to the surface 259 of tungsten carbide 260 both on the inboard radial face at 255 of the partial encapsulated ring 253.

Again, the surfaces 257 of tribaloy material 254 and the surface 259 of the tungsten carbide material 260 are pre-lapped and polished to the parameters heretofore described preferably prior to the insertion of annular ring 262 within the cone 228.

The preferred tribaloy material 56, 154 and 254 and the harder preferred opposing tungsten carbide material 60, 160 and 260 shown in FIGS. 2, 3, 4 and 5 may be deposited on their respective backup rings by, for example, plasma spray or D-gun (not shown). Alternatively, the material may be welded or brazed in place without departing from the scope of this invention.

The rings 54, 154, and 253 secured to the Belleville springs 40, 140, and 240 may be attached to the Belleville seal through vulcanization or securing with adhesives as heretofore described.

It will, of course, be realized that various modifications can be made in the design and operation of the present invention without departing from the spirit thereof. Thus, while the principal construction and mode of operation of the invention have been explained in what is now considered to represent its best embodiments which have been illustrated and described, it should be understood that within the scope of the appended claims, the invention may be practiced otherwise than as specifically illustrated and described.

What is claimed is:

1. A metal-to-metal Belleville seal for a rotary cone rock bit, said seal is positioned in a seal cavity formed between a leg of said rock bit, and a rotatable cone mounted on a journal bearing extending from said leg of said bit, said seal comprising:

a first metal ring, positioned adjacent a resilient material forming an outer peripheral end of said Belleville seal, said ring forming a diameter that will fit within said seal cavity, a first radially disposed sealing surface formed from a metallic material of said metal ring, said metal ring subsequently serves as part of said metal-to-metal Belleville seal; and a second metal, radially disposed sealing surface formed in said cone is positioned adjacent said first radially disposed sealing surface of said metal ring, said second metal sealing surface is formed from a metallic material in said cone, said metallic material forming said first sealing surface is softer than said metallic material forming said second sealing surface in said cone, said first and second sealing surfaces being pre-lapped to substantially perfect a seal between sealing surfaces prior to insertion of said first metal ring into said seal cavity formed between said leg and said cone of said rotary cone rock bit.

2. The invention as set forth in claim 1, wherein said first metal ring is secured to said resilient material forming said outer peripheral end of said Belleville seal, said first radially disposed sealing surface formed from said metallic material of said metal ring is exposed.

3. The invention as set forth in claim 1, wherein said resilient material is nitrile rubber.

4. The invention as set forth in claim 1, wherein said radially disposed sealing surface of said first metal ring is urged against said second metal radially disposed sealing surface by said Belleville seal.

5. The invention as set forth in claim 4, wherein the resilient material is bonded to the first metal ring by vulcanization.

6. The invention as set forth in claim 5, wherein the resilient material is bonded to the first metal ring by an adhesive.

7. The invention as set forth in claim 1, wherein a surface area formed by said first sealing surface is smaller than surface area formed by said second sealing surface, said larger second surface area serves to compensate for eccentricities which may develop between said first and second pre-lapped seal surfaces during operation of said rotary cone rock bit in a borehole.

8. The invention as set forth in claim 1, wherein the material forming said first sealing surface is selected from tribaloy intermetallic materials consisting of cobalt, silicon, molybdenum chromium, and nickel with a Rockwell C hardness range from 42 to 62.

9. The invention as set forth in claim 8, wherein the material forming said first sealing surface is tribaloy alloy T-800 consisting of about 3.0 percent nickel plus iron, 28.5 percent molybdenum, 17.5 percent chromium, 3.4 percent silicon, 0.08 percent carbon and the balance cobalt with a Rockwell C hardness of 62.

10. The invention as set forth in claim 1, wherein the material forming said first sealing surface is stellite with a Rockwell C hardness range from 42 to 62.

11. The invention as set forth in claim 1, wherein said first and second sealing surfaces is lapped flat within about 2 helium light bands.

12. The invention as set forth in claim 11, wherein the surface finish of said first and second sealing surfaces is 2 to 6 rms.

13. The invention as set forth in claim 1, wherein the material forming said second sealing surface is tungsten carbide having a Rockwell C hardness about 10 percent harder than said material forming said first sealing surface.

14. The invention as set forth in claim 13, wherein said material forming said second sealing surface is tungsten carbide with a Rockwell C hardness of about 72 when said material forming said first sealing surface is tribaloy alloy T-800 having a Rockwell C hardness of about 62.

15. The invention as set forth in claim 1, wherein said metallic material of said sealing surfaces formed on said first metal ring and said second metal is applied to said surfaces by a plasma spray process.

16. The invention as set forth in claim 15, wherein said metallic material is applied to the sealing surfaces of said first metal ring and said second metal by a D-gun process.

17. The invention as set forth in claim 1, wherein said second metal, radially disposed sealing surface is formed on a separate radially disposed ring, said ring forming inner and outer circumferences, said ring is adapted to be inserted into a circumferential cavity formed by said cone, said ring is subsequently secured to said cone.

18. The invention as set forth in claim 17, wherein said metallic material forming said first sealing surface of said first metal ring and said metallic material forming said second sealing surface of said separate radially disposed ring are pre-lapped prior to assembly of said first and second metal rings into said seal cavity.

19. The invention as set forth in claim 18, wherein said second radially disposed metal ring is metallurgically secured within said circumferential cavity formed by said cone.

20. A metal-to-metal Belleville seal for a rotary cone rock bit, said seal is positioned in a cavity formed between a leg of said rock bit and a rotatable cone mounted on a journal bearing extending from said leg of said bit, said seal comprising:

a first metal ring, said ring being at least partially encapsulated within a resilient material forming an outer peripheral end of said Belleville seal, said ring forming a diameter that will fit within said cavity, a first exposed, radially disposed sealing surface formed from a metallic material of said metal ring, said metallic material being a tribaloy alloy with a Rockwell C hardness range from 42 to 62, said metal ring subsequently serves as part of said metal-to-metal seal, and a second radially disposed sealing surface formed in said cone is positioned adjacent said first radially disposed sealing surface of said metal ring, said second metal sealing surface is formed from a metallic material in said cone, said second metallic material forming said sealing surface is tungsten carbide having a Rockwell C hardness about 10 percent harder than said material forming said first sealing surface, said first and second sealing surfaces being pre-lapped flat within about 2 helium light bands with a surface finish of said first and second sealing surfaces within 2 to 6 rms to substantially perfect a seal between sealing surfaces prior to insertion of said first metal ring into said cavity formed between said leg and said cone of said cone rotary rock bit, said Belleville seal serves to urge said first and second sealing surfaces together.

* * * * *